(12) United States Patent
Kim et al.

(10) Patent No.: US 6,842,929 B2
(45) Date of Patent: Jan. 18, 2005

(54) METHOD FOR CONTROLLING WASHING IN WASHING MACHINE

(75) Inventors: Jae Kyum Kim, Kimbae-shi (KR); Ho Cheol Kwon, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 10/233,623

(22) Filed: Sep. 4, 2002

(65) Prior Publication Data

US 2003/0041390 A1 Mar. 6, 2003

(30) Foreign Application Priority Data

Sep. 5, 2001 (KR) .......................................... 2001-54476

(51) Int. Cl.$^7$ ................................................ D06F 33/02
(52) U.S. Cl. .......................... 8/159; 68/12.04; 68/12.19
(58) Field of Search ............................... 8/158; 68/12.04, 68/12.02, 12.19, 207

(56) References Cited

U.S. PATENT DOCUMENTS

| | | | | |
|---|---|---|---|---|
| 4,503,575 A | * | 3/1985 | Knoop et al. ................... | 8/158 |
| 4,607,408 A | * | 8/1986 | Didier et al. ................... | 8/159 |
| 4,868,944 A | * | 9/1989 | Ishino et al. ................... | 8/158 |
| 5,689,846 A | * | 11/1997 | Cheyne et al. ................. | 8/158 |
| 5,768,729 A | * | 6/1998 | Cracraft .......................... | 8/158 |
| 5,768,730 A | * | 6/1998 | Matsumoto et al. ............ | 8/159 |
| 5,897,672 A | * | 4/1999 | Badami et al. ................. | 8/159 |
| 6,553,596 B2 | * | 4/2003 | Kim et al. ...................... | 8/159 |
| 6,634,191 B1 | * | 10/2003 | Guler et al. ............... | 68/12.04 |

FOREIGN PATENT DOCUMENTS

JP 1-218494 * 8/1989

* cited by examiner

Primary Examiner—Frankie L. Stinson
(74) Attorney, Agent, or Firm—McKenna Long & Aldridge LLP

(57) ABSTRACT

The present invention discloses a method for washing in a washing machine, which can measure an accurate washing load before actual washing is carried out. To do this, the present invention provides a method for controlling washing in a washing machine, including (a) introducing laundry into a drum of the washing machine, (b) measuring an initial washing load caused by the introduced laundry, (c) repeating water supply to the drum for a fixed time period for maintaining a minimum water level determined by the initial washing load, taking water absorbed to the laundry into account, (d) after the preset water supply time period, determining a final washing load in the drum based on a number of water resupply times for an elapsed time from the initial water supply, and (e) washing the laundry by a washing method preset according to the determined final washing load.

19 Claims, 4 Drawing Sheets

FIG. 4

| actual final washing load | total number of water re-supply times | a first time zone (weight value 1) | | a second time zone (weight value 3) | | | | a third time zone (weight value 1) | | | | | final evaluation values |
|---|---|---|---|---|---|---|---|---|---|---|---|---|---|
| | | 1minute | 2minute | 3minute | 4minute | 5minute | 6minute | 7minute | 8minute | 9minute | 10minute | | |
| light | 6 | 2 | 2 | | | 1 | | 1 | | | | | 8 |
| light | 5 | 2 | 2 | | | 1 | | 1 | | | | | 7 |
| light | 4 | 2 | | 1 | | 1 | | | | | | | 6 |
| light | 3 | 1 | | 1 | | 1 | | | | | | | 7 |
| light | 3 | | 1 | | | | 1 | | | | 1 | | 5 |
| heavy | 8 | 2 | 1 | 1 | | 2 | 1 | 1 | | | | | 16 |
| heavy | 7 | 2 | 1 | 1 | | 2 | | | 1 | | | | 13 |
| heavy | 7 | 2 | 1 | 1 | | 2 | | | 1 | | | | 13 |
| heavy | 8 | 2 | 2 | 1 | | 1 | 1 | | | 1 | | | 14 |
| heavy | 9 | 2 | 1 | 1 | | 1 | 2 | 1 | | | | 1 | 17 |

METHOD FOR CONTROLLING WASHING IN WASHING MACHINE

This application claims the benefit of Korean Patent Application No. 2001-54476, filed on Sep. 5, 2001, which is hereby incorporated by reference for all purposes as if fully set forth herein.

BACKGROUND OF THE INVENTION

1. Field of the Invention

The present invention relates to a method for controlling washing in a washing machine, and more particularly, to a method for controlling washing, in which a total amount of laundry and washing water in a drum is determined before starting the washing.

2. Discussion of the Related Art

In general, there are drum type washing machines and upright type washing machines. For better understanding of current washing methods, a system of the drum type washing machine will be explained as an example. FIG. 1 illustrates a cross section of a related art drum type washing machine.

Referring to FIG. 1, a tub 3 is fitted inside of a cabinet 5, and a drum 9 is fitted inside of the tub 3. The drum 9 is connected to a motor 6 via a drum shaft 13 for transmission of driving power to the drum 9. The drum shaft 13 has bearings 12 on both ends, and there is a bearing housing at a central part of a rear wall of the tub 3 for supporting the bearings 12. There is a stator 7 fixed to the rear wall of the tub 3, and there is a rotor 8, which forms a direct coupling type motor 6 together with the stator 7, coupled to the drum shaft 13. The drum 9 is directly connected to and rotates with the rotor 8.

A door 1 is fitted in a front part of the cabinet 5. A gasket 2 is fitted between the door 1 and the tub 3. There are hanging springs 4 between an inside top surface of the cabinet 5 and an upper part of an outside circumference of the tub 3, for supporting the tub 3. There is a frictional damper 10 between an inside bottom surface of the cabinet 5 and an outside bottom surface of the tub 3 for attenuating vibration of the tub 3. There is a motor sensor 11 fitted to one side of the motor 6 for detection of a number of revolutions of the rotor 8.

After laundry is placed into the drum 9, the related art drum washing machine 9 detects an initial load by means of an electric load on the motor 6 during rotation of the drum 9. Water is supplied to the drum 3 according to the initial load detected. As the laundry absorbs water, the water supply is repeated during a predetermined time period. If the water does not fill the drum to a certain level, water is re-supplied until the level is reached. If the laundry absorbs more water, the water level may fall below the certain level, water is re-supplied. Water resupply occurs only during the predetermined time period. After the laundry absorbs the water and the washing water is filled and remains above the certain level of the drum 9, the laundry is washed according to the laundry having the water absorbed therein and the washing water amount. In determination of a final laundry load, the final laundry load is determined to be heavy if a number of water resupply times counted during the water supply period is greater than a predetermined number of times (for an example, 10 times), and to be light if a number of water resupply times counted during the water supply period is fewer than the predetermined number of times. According to this, the washing machine carries out washing following a washing algorithm suitable to the final load.

However, the determination of the final washing load with reference to the number of water resupply times only causes a problem of inaccurate detection of the final washing load. That is, each type of laundry e.g., cotton fabric, or wool fabric has different water bearing property (i.e., a water absorption rate and a maximum water bearing quantity). Therefore, not only the number of water resupply times, but also the final washing load, vary with the types of laundry and ratios of the types of laundry in the initial washing load, even if the initial washing load (an amount of laundry before water supply) is the same. Moreover, the water bearing property may vary the number of water resupply times for the final washing load. Eventually, in the related art process, the final washing load is mis-detected because such different properties of the mixed-type laundry is not taken into account, leading to a washing process having a washing algorithm inconsistent with an actual washing load.

For an example, it may be determined that the laundry has a heavy washing load due to the number of water resupply times is greater than the predetermined number of times even if an actual final washing load is light. In this instance, because the light washing load proceeds according to a washing algorithm for the heavy washing load, an unnecessary excessive load may be placed on the motor causing elevation of a temperature and a reduced lifetime of the motor. On the contrary, when the heavy washing load is wrongly determined to be a light washing load because the number water resupply times is below the predetermined number of times, the quality of the washing may be poor.

SUMMARY OF THE INVENTION

Accordingly, the present invention is directed to a method of controlling washing in a washing machine that substantially obviates one or more of the problems due to limitations and disadvantages of the related art.

An advantage of the present invention is to provide a method for controlling washing in a washing machine, which can detect a washing load accurately before the washing is started.

For achieving the foregoing advantage of the present invention, a method for controlling washing in a washing machine includes (a) introducing laundry into a drum of the washing machine; (b) measuring an initial washing load caused by the introduced laundry; (c) supplying water to the drum repeatedly for a fixed time period to maintain a minimum water level determined by the initial washing load, considering water absorbed by the laundry; (d) determining a final washing load in the drum based on a number of water resupply times in each of a plurality of predetermined water resupply time zones, wherein the plurality of predetermined water resupply time zones form a total water resupply time period; and (e) washing the laundry by a washing method preset according to the determined final washing load. The initial washing load is weight of the laundry only before water is supplied and is measured by using a load on the motor by driving the motor coupled to the drum.

The step (c) of supplying water to the drum includes initially supplying water to the drum to a level higher than the predetermined minimum water level; rotating the drum so that the laundry absorbs water; measuring the water level in the drum during the rotation of the drum to determine if the water level is below the predetermined minimum water level; and repeating resupplying water to the drum to restore a water level higher than the predetermined minimum water level when the water level in the drum is below the predetermined minimum water level.

The step (c) of supplying water to the drum further includes measuring the number of water resupply times after the water supply step and an elapsed time after the initial water supplying to each of the water resupplyings. The step (c) may further include the steps of when the water level in the drum exceeds the minimum water level, determining if the elapsed time after the initial water supply is longer than a fixed time period, and when the elapsed time is shorter than the fixed period, repeatedly determining if the water level in the drum is below the minimum water level. Preferably, the fixed time period is set to be 10 minutes.

The final washing load is a total weight of the laundry, the water absorbed and the washing water. The step (d) evaluates that the greatest washing load increase occurs in a time zone the greatest water absorption occurs in the water resupply time period.

The step (d) of determining the final washing load includes calculating a number of water resupplyings made for each of the plurality of water resupply time zones; multiplying a respective weight value given for each of the water resupply time zones and the number of water resupply times for the respective water resupply time zone to produce an evaluation value for each of the water resupply time zones; summing the evaluation values for the water resupply time zones to produce a final washing load evaluation value; and comparing the produced evaluation value to a preset reference value for determining the final washing water load.

The water resupply time period is divided into three time zones inclusive of a first time zone, a second time zone, and a third time zone, and preferably, the first time zone is from zero to three minutes, the second time zone is from three to six minutes, and the third time zone is from six to ten minutes.

The time zone in which the greatest water absorption is occurred is given the greatest weight value. Accordingly, in one embodiment, the first time zone has a weight value of 1, the second time zone has a weight value of 3, and the third time zone has a weight value 1.

In one embodiment, the evaluation reference value is 10 for the set weight values discussed above, and the final washing load is determined to be light if the evaluation value is below 10, and the final washing load is determined to be heavy if the evaluation value exceeds 10.

The washing method has different washing and spinning time periods, different rotation speed of the washing drum, and the like.

As the final washing load is detected accurately and a series of washing steps are controlled by an algorithm consistent to an actual final load by the present invention, not only enhancement of the washing performance is achieved, but also overload of the motor can be prevented.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Reference will now be made in detail to an embodiment of the present invention, example of which is illustrated in the accompanying drawings.

Figure 1:
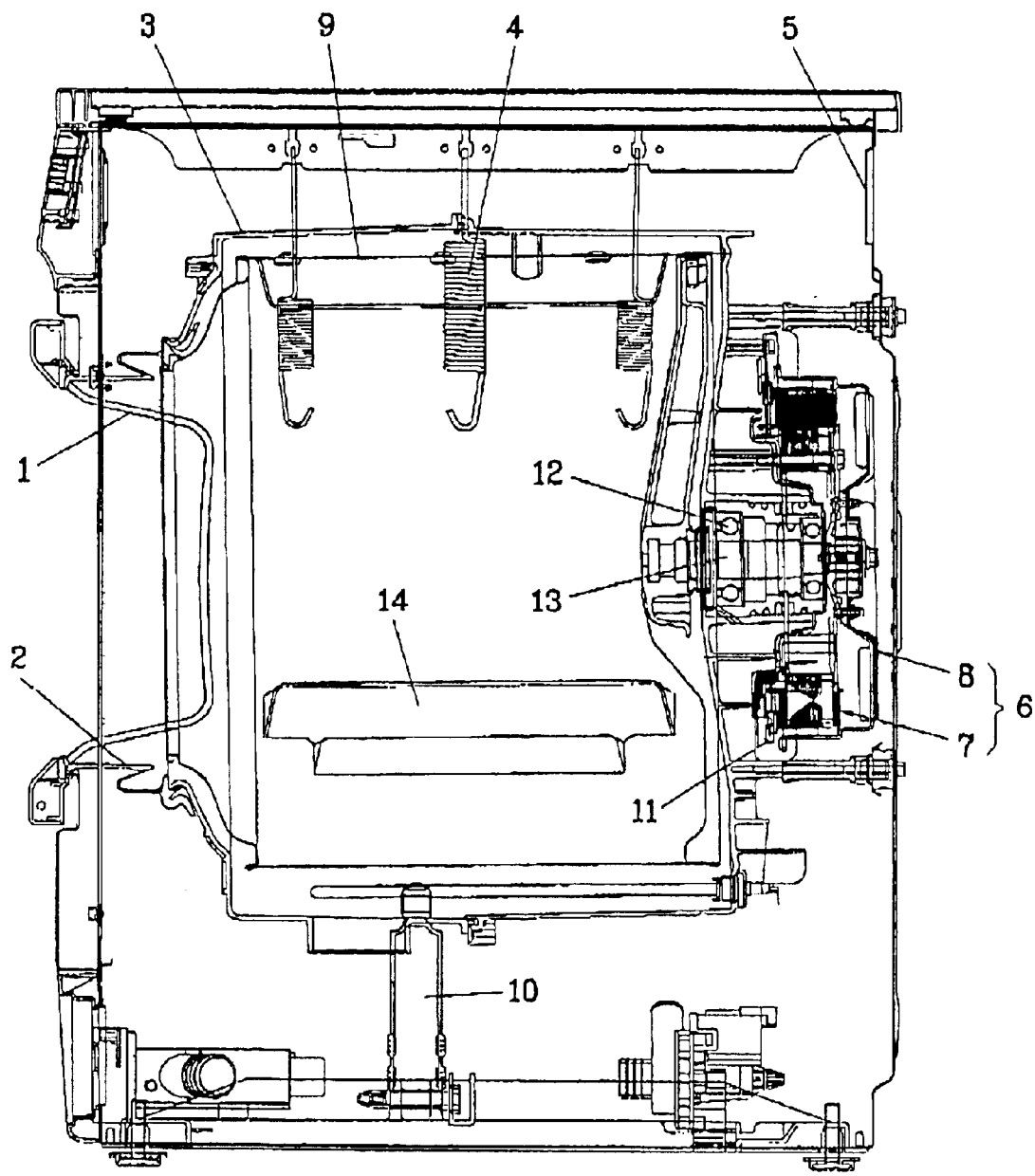
FIG. 1 illustrates a cross-section of a related art drum type washing machine.
Figure 2:
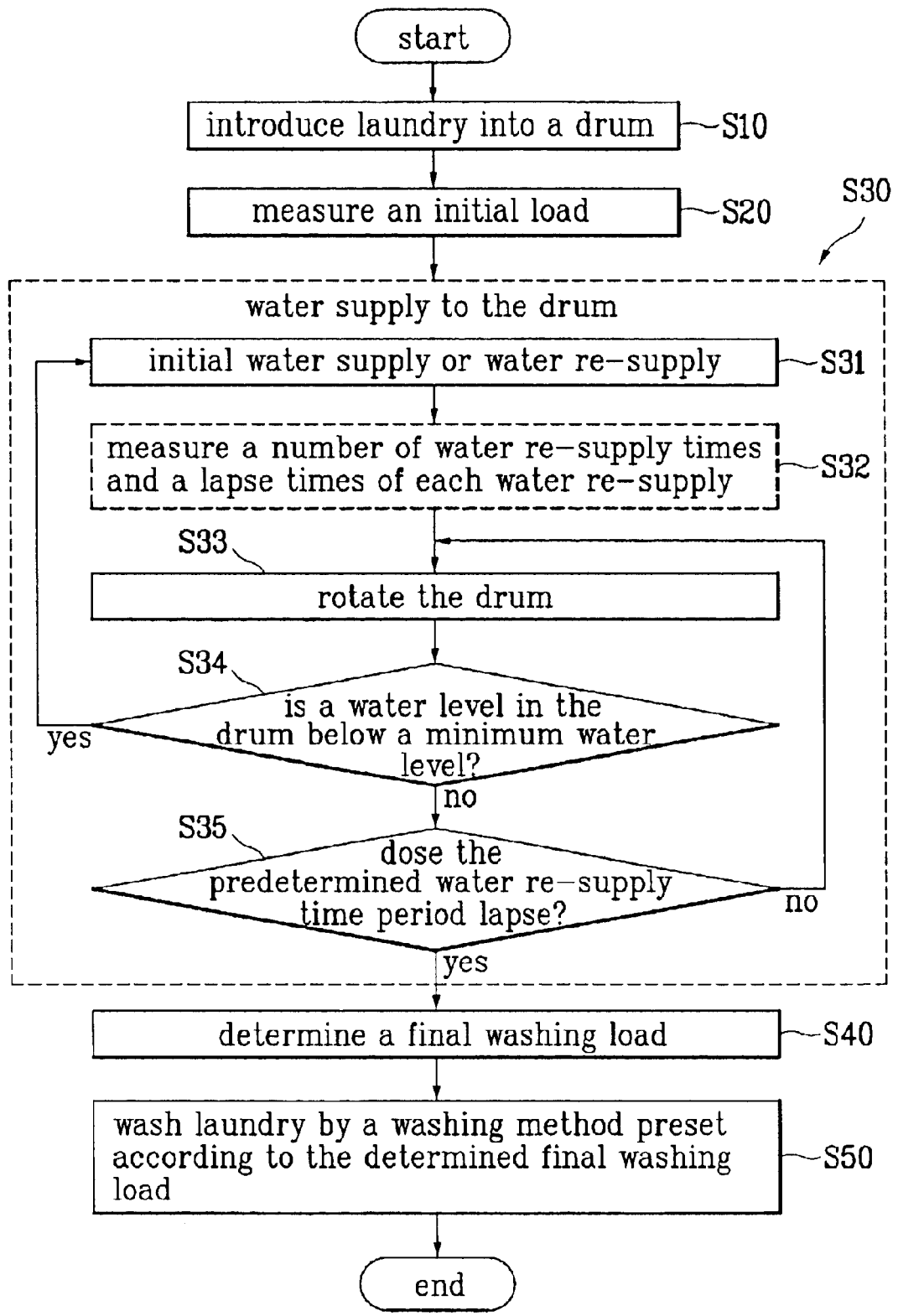
FIG. 2 illustrates a flow chart showing the steps of a method for controlling washing in accordance with the present invention.
Figure 3:
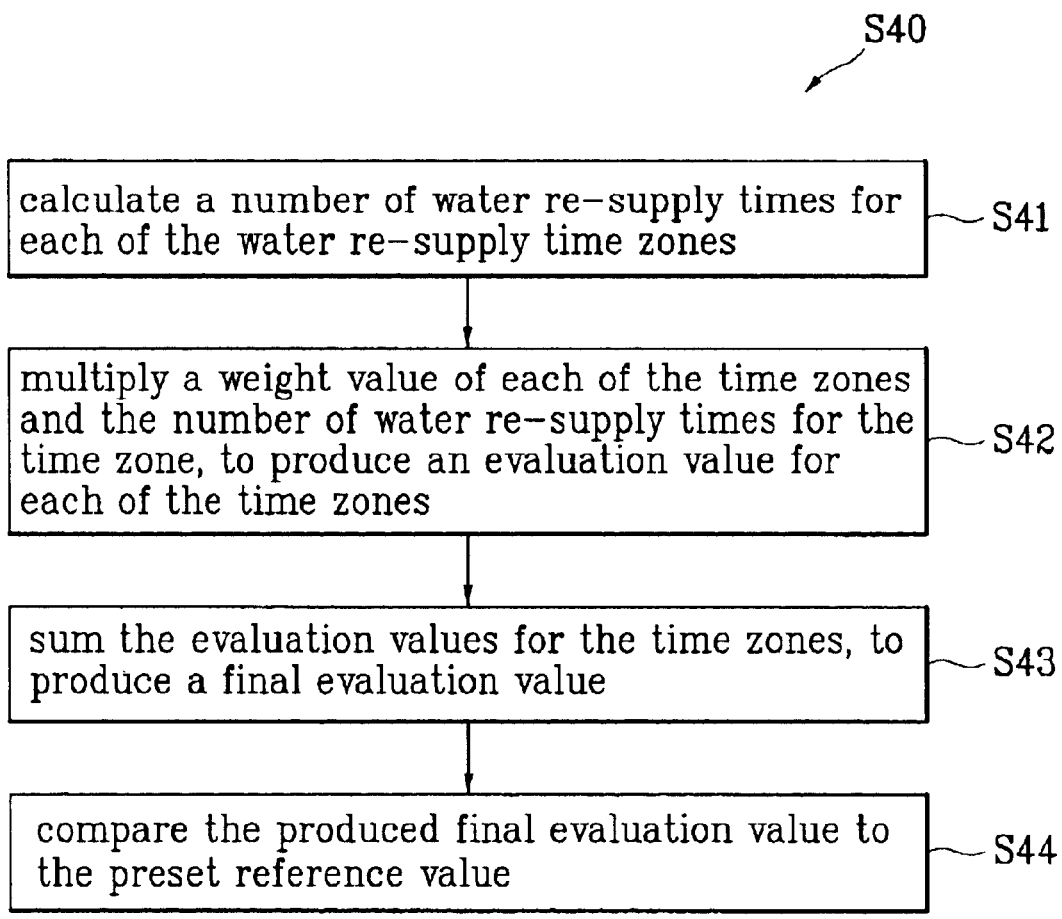
FIG. 3 illustrates a flow chart showing the sub-steps for determining a final washing load in the method for controlling washing in accordance with the present invention; and, FIG. 4 illustrates a table showing a result of a final washing load evaluation according to the method for controlling washing in a washing machine of the present invention.

FIG. 2 illustrates a flow chart showing the steps of a method for controlling washing in accordance with embodiment of the present invention. FIG. 3 illustrates a flow chart showing the sub-steps for determining a final washing load in the method for controlling washing in accordance with the present invention.

At first, a predetermined amount of laundry is introduced into a washing drum for washing in the washing machine (S10). Typically, the laundry includes different types of fabric, such as cotton fabric and wool fabric. Moreover, states of each of the fabrics (for an example, the fabric is wet or dry) also differ.

When a user puts the washing machine into operation after the laundry is introduced, a series of washing steps are started by a controller in the washing machine. At first, the washing machine measures an initial washing load in the drum (S20), that is, the initial load is a weight of the introduced laundry, actually. Though the initial washing load (laundry weight) may be measured by various known methods, the initial washing load may be conveniently measured by driving the motor coupled to the drum and measuring the load on the motor. Moreover, though there may be a slight deviation, an approximate volume of the laundry can also be calculated.

Upon finishing measuring the initial load (S20), the washing machine opens a water supply valve in the washing machine to supply water into the drum (S30).

In supplying water to the drum (S30), at first, an initial water supply is made into the drum up to a water level higher than a predetermined minimum water level (S31). The minimum water level is a water level of the washing water in the drum required basically for smooth washing when the washing is started and varies with the initial washing load. In the step (S31), the water level in the drum is measured by the water level sensor in the washing machine. Using this information the water supply to the minimum water level can be accurately determined.

Once the water level in the drum reaches the minimum water level, the drum is rotated (S33). The laundry absorbs the water better as the laundry is rotated together with the drum to be suitable for the washing. The drum rotation is continuous throughout the water supplying (S30) and may be carried out along with the water supplying or resupplying even before the minimum water level is reached so that the laundry can absorb the washing water earlier.

The absorption of water by the laundry during the rotation of the drum reduces the actual water level in the drum. Therefore, after the water is supplied, the washing machine, i.e., the controller, keeps determining if the present water level is below the minimum water level (S34). In more detail, the water level sensor keeps measuring the water level in the drum, and the controller keeps comparing the measured water level to a preset minimum water level.

In this instance, if the measured water level is below the minimum water level, water is re-supplied the drum so that the water level in the drum is over the minimum water level (S31). To do this, the controller opens the water supply valve until a water level higher than the minimum water level is detected at the water level sensor. The controller repeats the water resupply (S31) whenever it is determined that the water level in the drum is below the minimum water level (34).

Whenever the step (S31) is repeated, the number of water resupply times and an elapsed time from finish of the initial water supply step (S31) to respective water resupply steps (S31) are measured (S32) and such information is then stored in the controller.

On the other hand, once the measured water level in the drum exceeds the minimum water level (S34), it is determined if the elapsed time after the initial water supply step (S31) is longer than the predetermined water resupply time period (S35). That is, once the drum is supplied with water to the minimum water level, the controller measures the time period after that and compares to the stored predetermined water resupply time period. Since it is verified that all the laundry absorbs water adequately within ten minutes substantially as a result of experiment, it is preferable that the water resupply step is set to be ten minutes.

If the elapsed time is shorter than the water resupply time period, the controller determines that the laundry is not wet adequately yet. Therefore, the step (S34) for determining the water level in the drum of being the minimum water level is also repeated, and the drum also continues rotating to assist the laundry in absorbing water (S32).

If the elapsed time is longer than the water resupply time period, the controller determines that the laundry is wet adequately and stops the water supply. The series of water supply steps (S31–S35) facilitates maintaining the minimum water level taking the water absorbed by the laundry into account as well as the water to get the laundry wet adequately for the washing.

Following the water supply step (S30), a final washing load in the drum is determined for selecting an appropriate washing type (S40). Since the laundry is in a state the laundry absorbs water adequately in the determining step (S40), the final washing load is the total of the absorbed water, the laundry, and the supplied water. In the meantime, as explained, the final washing load is influenced by the water bearing property such as the water absorbing rate within a limited water supply time period and a maximum water bearing ratio substantially. Therefore, it is preferable that the final washing load is determined by taking into account the time it takes for the minimum water level to be reached and maintained. Accordingly, in the present invention, the final washing load is determined with reference to a number of water resupply times at each elapsed time after the initial water supply. In order to obtained a more accurate final washing load, it is evaluated that the greatest washing load increase occurs in a time zone during which the greatest water absorption actually occurs within the water resupply time period. Such a final washing load determining step (S40) of the present invention will be explained in detail with reference to FIG. 3.

At first, in the determining step (S40), the number of water resupply times performed in each of a plurality of preset water resupply time zones is calculated (S41). Each of the time zones is obtained by dividing an entire water resupply time period into a plurality of time periods, which is provided to the controller in advance. The controller sums the number of water resupply times for each of the preset time zones by using the measured values (the number of water resupply times and the elapsed times) in the measuring step (S32). Moreover, in the present invention, the number of water resupply times may be divided into three time zones, i.e., a first time zone, a second time zone, and a third time zone. Statistically, the laundry actively absorbs water shortly after the laundry contacts the water. The rate of absorption is reduced as the actual water absorbed approaches the maximum water bearing ratio of the laundry. The water absorption rate of the laundry increases after a slight time period is passed, is constant for a certain time period, and decreases as the amount of absorbed water approaches the maximum water bearing amount. Accordingly, taking such a water bearing property into account, in the present invention, the first time zone is set to be zero to three minutes, which is assumed to be an initial stage of water absorption; the second time zone is set to be three to six minutes, which is assumed to be an intermediate stage in which the water absorbing rate increases; and the third time zone is set to be six to ten minutes which is assumed to be a final stage of the water absorption.

Then, a weight value for each time zone and the number of water resupply times for the respective time zone are multiplied to produce an evaluation value for each time zone (S42). The weight value is a dimensionless value that is stored in the controller in advance and is different for each of the time zones. Then, the controller produces a series of dimensionless values, which are useful for actual final washing load evaluation because the values actually represent the final washing loads for each of the time zones. In the step of producing the evaluation values (S42), it is preferable that the greatest weight value is given to the time zone in which the greatest water absorption occurs for accurate evaluation of the final washing load. Accordingly, in the present invention, the first time zone (zero to three minutes), a comparatively initial stage of the washing water absorption comparatively, has the weight value of one; and the second time zone (three to six minutes), which has an increased washing water absorption rate, has the weight value of three. A weight value of one is given to the third time zone (six to ten minutes), which is the final stage of the water absorption that is similar to the water absorptim of the first time zone. At the end, actual evaluation values for each of the time zones that take into account a washing load increase ratio relative to the water bearing property can be obtained in the producing step (S42).

The evaluation values for each of the time zones are summed at the controller to produce a final washing load evaluation value (S43). Thus, the final washing load evaluation value is summarized as follows from the previous steps (S41–S43).

$$F=(N_1 \times A_1)+(N_2 \times A_2)+ \cdots +(N_n \times A_n)$$

Where, F: a final washing load evaluation value,

N: a number of water resupply times for each time zone,

A: a weight value for each time zone, and n: a number of divided time zones.

Since actual washing loads for each of the time zones are summed in the foregoing equation, a resulting evaluation value represents comparatively accurate final washing load, which can be confirmed in the actual experiment shown in FIG. 4.

In the experiment shown in FIG. 4, after the water supplying steps (S30) are carried out for total 10 different initial washing loads, the final evaluation value is produced for each of the 10 different initial washing loads through the steps (S41–S43). Then, after actual measurements, the final washing loads for the initial washing loads are classified into two categories of 'light' and 'heavy' based on the actual loads that determine washing methods. The number of water resupply times and the final evaluation values for the classified final washing loads are summarized as shown in FIG. 4. Referring to FIG. 4, it can be noted that, although the number of water resupply times show no great difference between the two categories, the final evaluation values show significant differences. That is, while the light categories show evaluation values below 8, the heavy categories show evaluation values above 13. Thus, as the final washing loads can be identified to be light or heavy by the evaluation values distinctively, it can be understood that the evaluation value is useful in the determination of the washing load.

Finally, the produced evaluation value is compared to the preset reference value for determining the final washing load (S44). As shown in FIG. 4, since a middle value of a maximum value '8' of the light category and a minimum value 13 of the heavy category is 10 approximately, it is appropriate that a reference value for determining the final washing load is 10. Accordingly, if the evaluation value is less than 10 in the comparing step (S44), the final washing load is determined to be light, and if the evaluation value exceeds 10, the final washing load is determined to be heavy.

Thus, after finishing the series of determining steps (S41–S44), the laundry is washed by a washing method preset for the determined final washing load (S50). That is, the controller has washing methods set properly for the heavy or light washing loads and performs the washing by using a washing method selected according to a result of the determination. Actually, the washing methods perform the washing in different washing and spinning time periods, different rotation speed of the washing drum, and the like according to the final washing loads.

In the meantime, although the foregoing embodiment has 10 minutes of water supply time period, the water supply time period may be varied with other conditions, such as a capacity of the washing machine, appropriately. Moreover, though three divided time zones are disclosed in the determining step (S40), the water supply time zone may be sub-divided into more number of time zones, by giving weight values suitable to those time zones, more accurate final load measurement is made available.

The method for controlling washing in a washing machine of the present invention permits a more accurate and quantitative determination of the final washing load as a water bearing property of the laundry is taken into account by using a number of water resupply times for each elapsed time from an initial water supply and by using a weight value varied with the number of water resupply times. Therefore, by carrying out the washing according to a washing method consistent with an actual washing load, the present invention can enhance a washing performance and prevent overload of the motor, thereby improving a system stability and reliability of the washing machine.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for controlling washing in a washing machine, comprising the steps of:
   (a) introducing laundry into a drum of the washing machine;
   (b) measuring an initial washing load caused by the introduced laundry;
   (c) supplying water to the drum repeatedly for a fixed time period to maintain a minimum water level determined by the initial washing load, considering water absorbed by the laundry;
   (d) determining a final washing load in the drum based on a number of water resupply times in each of a plurality of predetermined water resupply time zones, wherein the plurality of predetermined water resupply time zones form a total water resupply time period; and
   (e) washing the laundry by a washing method preset according to the determined final washing load.

2. The method according to claim 1, wherein the fixed time period is a period of the initial water supply and a period of total resupply.

3. The method as claimed in claim 1, wherein the initial washing load is weight of the laundry only before water is supplied.

4. The method as claimed in claim 3, wherein the initial washing load is determined by measuring a load on the motor while driving the motor coupled to the drum.

5. The method as claimed in claim 1, wherein supplying water to the drum includes:
   initially supplying water to the drum to a level higher than the predetermined minimum water level;
   rotating the drum so that the laundry absorbs water,
   measuring the water level in the drum during the rotation of the drum to determine if the water level is below the predetermined minimum water level; and
   repeating resupplying water to the drum to restore a water level higher than the predetermined minimum water level when the water level in the drum is below the predetermined minimum water level.

6. The method as claimed in claim 5, wherein supplying water to the drum further includes measuring the number of water resupply times and an elapsed time after the initial water supply period to each of the water resupplyings.

7. The method as claimed in claim 5, wherein supply water to the drum further includes:
   when the water level in the drum exceeds the predetermined minimum water level, determining if the elapsed time after the initial water supply is longer than the fixed time period, and
   when the elapsed time is shorter than the fixed time period, repeatedly determining if the water level in the drum is below the minimum water level.

8. The method as claimed in claim 7, wherein the fixed time period is set to be 10 minutes.

9. The method as claimed in claim 1, wherein the final washing load is a total weight of the laundry, absorbed water and washing water.

10. The method as claimed in claim 1, wherein determining a final washing load includes determining the predetermined water resupply time zone in which the greatest washing load increase occurs according to when the greatest water absorption occurs.

11. The method as claimed in claim 10, wherein determining a final washing load includes:
- calculating a number of water resupplyings made for each of the plurality of water resupply time zones;
- multiplying a respective weight value given for each of the water resupply time zones and the number of water resupply times for the respective water resupply time zone to produce an evaluation value for each of the water resupply time zones;
- summing the evaluation values for the water resupply time zones to produce a final washing load evaluation value; and
- comparing the produced evaluation value to a preset reference value for determining the final washing water load.

12. The method as claimed in claim 11, wherein the fixed time period is divided into three water resupply time zones inclusive of a first time zone, a second time zone, and a third time zone.

13. The method as claimed in claim 12, wherein the first time zone is from zero to three minutes, the second time zone is from three to six minutes, and the third time zone includes six to ten minutes.

14. The method as claimed in claim 12, wherein the first time zone is from zero to two minutes, the second time zone is from two to six minutes, and the third time zone is from six to ten minutes.

15. The method as claimed in claim 11, wherein the time zone in which the greatest water absorption is occurred is given the greatest weight value.

16. The method as claimed in claim 11, wherein the first time zone has a weight value of 1, the second time zone has a weight value of 3, and the third time zone has a weight value 1.

17. The method as claimed in claim 11, wherein the evaluation reference value is 10.

18. The method as claimed in claim 17, wherein the final washing load is determined to be light if the evaluation value is below 10, and the final washing load is determined to be heavy if the evaluation value exceeds 10.

19. The method as claimed in claim 1, wherein the washing method may include a plurality washing and spinning time periods and rotation speeds of the washing drum.

* * * * *